(12) United States Patent
Pistoia

(10) Patent No.: US 6,322,927 B1
(45) Date of Patent: *Nov. 27, 2001

(54) VANADATE CATHODE ACTIVE MATERIAL AND METHOD OF MAKING SAME

(75) Inventor: Gianfranco Pistoia, Rome (IT)

(73) Assignee: Valence Technology, Inc., Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/284,956

(22) Filed: Aug. 2, 1994

Related U.S. Application Data

(63) Continuation-in-part of application No. 08/193,682, filed on Feb. 4, 1994, now abandoned.

(51) Int. Cl.⁷ .................................................. H01M 4/48
(52) U.S. Cl. .................................. 429/231.2; 429/218.1; 423/593
(58) Field of Search .................. 423/593; 429/218.1, 429/231.2

(56) References Cited

U.S. PATENT DOCUMENTS

| | | |
|---|---|---|
| 3,063,795 | 11/1962 | Smith . |
| 3,063,796 | 11/1962 | Kalmers . |
| 3,728,442 | 4/1973 | Pakhomov et al. . |
| 4,009,052 | 2/1977 | Whittingham . |
| 4,061,711 | 12/1977 | Morgan et al. . |
| 4,118,550 | 10/1978 | Koch . |
| 4,119,707 | 10/1978 | Thome et al. . |
| 4,792,504 | 12/1988 | Schwab et al. . |
| 4,830,939 | 5/1989 | Lee et al. . |
| 4,879,190 | 11/1989 | Lundsgaard . |
| 4,990,413 | 2/1991 | Lee et al. . |
| 5,013,620 | 5/1991 | Miyazaki et al. . |
| 5,037,712 | 8/1991 | Shackle et al. . |
| 5,039,582 | 8/1991 | Pistoia . |
| 5,229,225 | 7/1993 | Shackle . |
| 5,336,572 | * 8/1994 | Koksbang ........................ 429/218 |

OTHER PUBLICATIONS

Pasquali and Pistoia, "Lithium Intercalation in $Na_{i+x}V_3O_8$ Synthesized by a Solution Technique", Electrochim Acta, vol. 36 (10), p1550, 1991.*

Manev et al. "Potassium Vanadates–Promising Materials . . . " J. Power Sources, 43–44 (1993) 561–568.*

Andrukaitis, "Reversible Potassium Vanadium Bronze Cathodes . . . " J. Power Sources, 43–44 (1993) 603–610.*

B.D. Cullity, *Elements of X–Ray Diffractions*, 2$^{nd}$ Edition, Addison–Wesley Publishing Co, 1978 pp. 178, 518–519.*

G. Pistoia, M. Pasquali, G. Wang, L. Li, $Li/Li_{1+x}V_3O_8$ Secondary Batteries, J. Electrochem. Soc., vol. 137, No. 8, Aug. 1990, pp 2365–2370.

(List continued on next page.)

Primary Examiner—Carol Chaney
(74) Attorney, Agent, or Firm—Harness, Dickey & Pierce, P.L.C.

(57) ABSTRACT

A method of making a composition of the nominal general formula $Na_yK_xV_3O_8$, with a unit structure of preferred nominal general formula $Na_{1-x}K_xV_3O_8$, such structure being able to accept lithium ions. The method as exemplified by the formation of $Na_{1-x}K_xV_3O_8$, comprises forming a mixture of hydroxides of sodium and potassium and then adding vanadium pentoxide ($V_2O_5$) in an amount sufficient to provide a stoichiometric ratio of approximately 1:3 of $Na_{1-x}K_x$ to vanadium and preferably heating the mixture while stirring to cause formation of a precipitate product of the formula $Na_{1-x}K_xV_3O_8$. The new composition preferably contains x greater than or equal to 0.3 and less than or equal to 0.4. Preferred compositions have the nominal general formula $Na_{0.7}K_{0.3}V_3O_8$ and $Na_{0.6}K_{0.4}V_3O_8$.

6 Claims, 10 Drawing Sheets

OTHER PUBLICATIONS

G. Wang and G. Pistoia, Rechargeable All Solid–State Lithium and Sodium Cells with Composite Cathodic Films Based on $Na_{1+x}V_3O_8$, J. Electroanal. Chem., 302 (1991), pp 275–278.

G. Pistoia, L. Li, and G. Wang, Direct Comparison of Cathode Materials of Interest for Secondary High–Rate Lithium Cells, Electrochimica Acta, Vo. 37, No. 1, pp 63–68, 1992.

J.P. Pereira–Ramos, N. Baffier, and G. Pistoia, Cathode Lithium Batteries—New Materials, Developments, and Perspectives, Chapter 7, Industrial Chemistry Library, vol. 5, 1994.

USSN: 08/193,682; Filed: Feb. 4, 1994; G. Pistoia.

J. Power Sources 43/44 (1993) 561–568.

Solid State Ionics 40/41 (1990) 585–588.

Electrochim. Acta 36 (1991) 1549.

Howard T. Evans, Jr. and Stanley Block, The Crystal Structures of Potassium and Cesium Trivanadates, Inorganic Chemistry, vol. 6, No. 10, Oct. 1966, pp 1808–1814.

\* cited by examiner

VANADATE CATHODE ACTIVE MATERIAL AND METHOD OF MAKING SAME

RELATED APPLICATION

The subject application is a continuation-in-part of co-pending application Ser. No. 08/193,682 filed on Feb. 4, 1994, and now abandoned.

FIELD OF THE INVENTION

This invention relates to a cathode active material and cathodes for electric current producing and storage cells and method of making same.

BACKGROUND OF THE INVENTION

Lithium-based cells or batteries often comprise cathodes of transition metal oxides which are used as intercalation compounds. The intercalation reaction involves the interstitial introduction of a guest species, namely, lithium into the host lattice of the transition metal oxide, essentially without structural modification of the host lattice. Such intercalation reaction is essentially reversible because suitable transition states are achieved for both the forward and reverse of the intercalation reaction.

The basic components of a lithium cell typically include a lithium anode, a separator, and a metal oxide intercalation cathode active material such as a vanadium oxide compound also referred to as vanadates or vanadate compounds. The cathode is usually a mixture of such oxide compound and other components such as graphite and an electrolyte/binder which provide ionic transport. During cell operation, incorporation of lithium in the metal oxide occurs. Some vanadates have high initial capacities, which, however, rapidly decline especially in the first cycles. Many metal oxides are prepared in a complex process by mixing precursor components containing an alkali metal with vanadium pentoxide and then baking the mixture to a temperature in the range of about 700° C. (centigrade) to 800° C. to cause formation of the product. The molten product is then cooled and ground up into a powder. The melt process has certain disadvantages because it is difficult to handle molten metal oxides at high temperatures and special procedures are required; there is a reaction between the molten product and containers used for conducting the reaction which thereby causes contamination of the product; and a significant amount of mechanical energy is required to grind the cooled, solidified products into a powder for inclusion in a cathode composition of an electrochemical cell. Despite these difficulties, typical melt processes, as described in U.S. Pat. No. 5,013,620, continue to be used to obtain positive electrode active material, such as $LiV_3O_8$. Recently, it has been suggested to form vanadium oxide compounds by reaction of a precursor oxide with an alkali hydroxide such as LiOH (Pistoia U.S. Pat. No. 5,039,582). Still another approach relies on reaction of an alkali with metavanadate ($VO_3$) in an acidified solution. This approach has been used with the alkali being potassium or sodium. (*Solid State Ionics* 40/41 (1990) 585–588; *J. Power Sources* 43/44 (1993) 561–568.) Despite the many available compounds and methods, it is desirable to have a new active material which has a high specific energy, high cycle life and high rate capability; and a method for preparing such active material which is relatively simple and economical, which does not require handling metal oxide constituents in a molten state, and which achieves good conversion of the starting materials to the final metal oxide product.

SUMMARY OF THE INVENTION

The present invention provides a cathode active material having as its major component, or consisting essentially entirely of an oxide of vanadium of the nominal general formula $A_yZ_xV_3O_8$ where A and Z are each selected from the group of alkali metals, excluding lithium, x and y are each greater than 0 and where the sum of x and y is less than 2; and where such active material in a lithiated state is represented by the nominal general formula $Li_aA_yZ_xV_3O_8$ where a is greater than 0 and up to about 4. A preferred active material of the invention is represented by the nominal general formula $Na_yK_xV_3O_8$ where the sum of x+y is greater than or equal to about one and less than two. Preferably, x+y is greater than one.

Preferably, the vanadium oxide based active material ($A_yZ_xV_3O_8$, $Na_yK_xV_3O_8$) is prepared for use in cells with an anode active material made of lithium or a compound which includes lithium. The cells also include an electrolyte which is electrochemically stable with respect to the cathode active material and the lithium, and which allows lithium ions from the anode (negative electrode) to move through the electrolyte to react electrochemically with the cathode (positive electrode) active material of the invention. The electrolyte may be liquid, solid, polymeric, and in the case of a liquid electrolyte, typically includes a separator.

A preferred lithium cell comprises the positive electrode active material of the invention, a negative electrode which is metallic lithium, and an electrolyte which is in the form of a polymeric network containing an electrolyte solution comprising a metal salt of lithium.

In one embodiment, the cathode active material of the nominal general formula ($A_yZ_xV_3O_8$, $Na_yK_xV_3O_8$) is prepared in a series of steps. In the first step, a mixture comprising sodium hydroxide and potassium hydroxide is prepared with the relative amounts of the hydroxides being sufficient to provide $Na_y$ and $K_x$, where the sum of x+y is greater than 1 and less than 2. It is preferred that the hydroxide mixture be prepared with relative amounts of the hydroxides to provide, on the basis of mole equivalent in total of sodium (Na) and potassium (K), $Na_{1-x}K_x$, where x is greater than or equal to zero and less than or equal to one ($0 \leq x \leq 1$). In the next step, progressive amounts of an oxide of vanadium having the general formula $V_2O_5$ (vanadium pentoxide) is added preferably while stirring the mixture. It is preferred that vanadium pentoxide be added so as to provide about three moles equivalent of vanadium for each mole equivalent of the $Na_{1-x}K_x$. Either before adding the vanadium pentoxide or while adding the vanadium pentoxide the temperature of the mixture is maintained in a range of up to about the boiling point of the mixture and preferably no less than about room temperature (i.e. 10° centigrade). The vanadium pentoxide and hydroxides react and such reaction is manifest by a change in the color from the characteristic yellow/yellow-red of vanadium to a red/brown color and the formation of a solid precipitate. The solid precipitate is separated from the mixture and dried to obtain a powder of an oxide of vanadium having the nominal general formula $Na_{(1-x)}K_xV_3O_8$. It should be noted that the value of oxygen in the final product may be slightly different from 8 if the sum of x+y exceeds 1 and if $V^{+4}$ is present together with $V^{+5}$. Accordingly, the general formula may also be written as: $Na_yK_xV_3O_{8\pm z}$; where x+y is greater than 1 and less than 2, and the value of z normally varies between about −0.1 and +0.1, so that the amount of oxygen normally varies between about 7.9 and 8.1.

It is preferred that the mixture contains a stoichiometric amount of the hydroxides and pentoxides. This corresponds to about two moles total of the hydroxide for each three moles of vanadium pentoxide; this will yield a product having about one mole equivalent of total alkali ($Na_{1-x}K_x$)

for each three moles of vanadium, since each mole of vanadium pentoxide contains two moles of vanadium. It is preferred that the mixture be heated to an elevated temperature in a range to about 80 to 90° centigrade for up to about 24 hours. The progress of the reaction as stated is monitored by observing a color change. It is preferred that the product precipitate, typically in the form of a gel, be separated from the mixture and dried at a temperature of about 300° centigrade.

The vanadium oxide product of the invention is in the form of a fine powder having a surprising small particle size on the order of one micron. It was tested in a cell to determine the behavior of specific capacity at an increasing number of charge and discharge cycles and showed markedly improved characteristics as compared to a vanadium oxide having only a single alkali constituent.

While not wishing to be held to any particular theory, it is thought that the $Na_{1-x}K_xV_3O_8$ (Na—K vanadate) of the invention has a layered structure resembling that of $NaV_3O_8$, but the interlayer distance is larger due to the presence of $K^+$. This facilitates $Li^+$ diffusion and accommodation in the structural sites. This results in a higher diffusion coefficient, in square centimeter per second for the $Na_{1-x}K_xV_3O_8$ probably due to the presence of $K^+$. Accordingly, the mixed Na—K vanadates have a higher rate capability and can be cycled at current densities above 2 mA/cm$^2$ with limited capacity loss. Upon $Li^+$ intercalation, the interlayer distance shrinks to a limited extent, less than 10% and usually less than 5%. This helps the Na—K vanadate structure to maintain its integrity and probably accounts for the high cycle life of this material.

It is an object of the invention to provide a new method for preparing a metal oxide positive electrode active material for a lithium battery. Another object is to provide a lithium battery having good charge and discharge capacity. Another object is to provide an improved electrochemical battery based on lithium which maintains its integrity over prolonged life cycle as compared to presently used batteries. Another object is to provide vanadium oxide active material which is relatively cheap, easy to prepare, with a high specific energy, high cycle life, and high rate capability. Another object is to provide good conversion of the starting materials to the metal-oxide product.

These and other objects, features and advantages will become apparent from the following description of the preferred embodiments, appended claims and accompanying drawings.

DETAILED DESCRIPTION OF THE PREFERRED EMBODIMENTS

Figure 1:
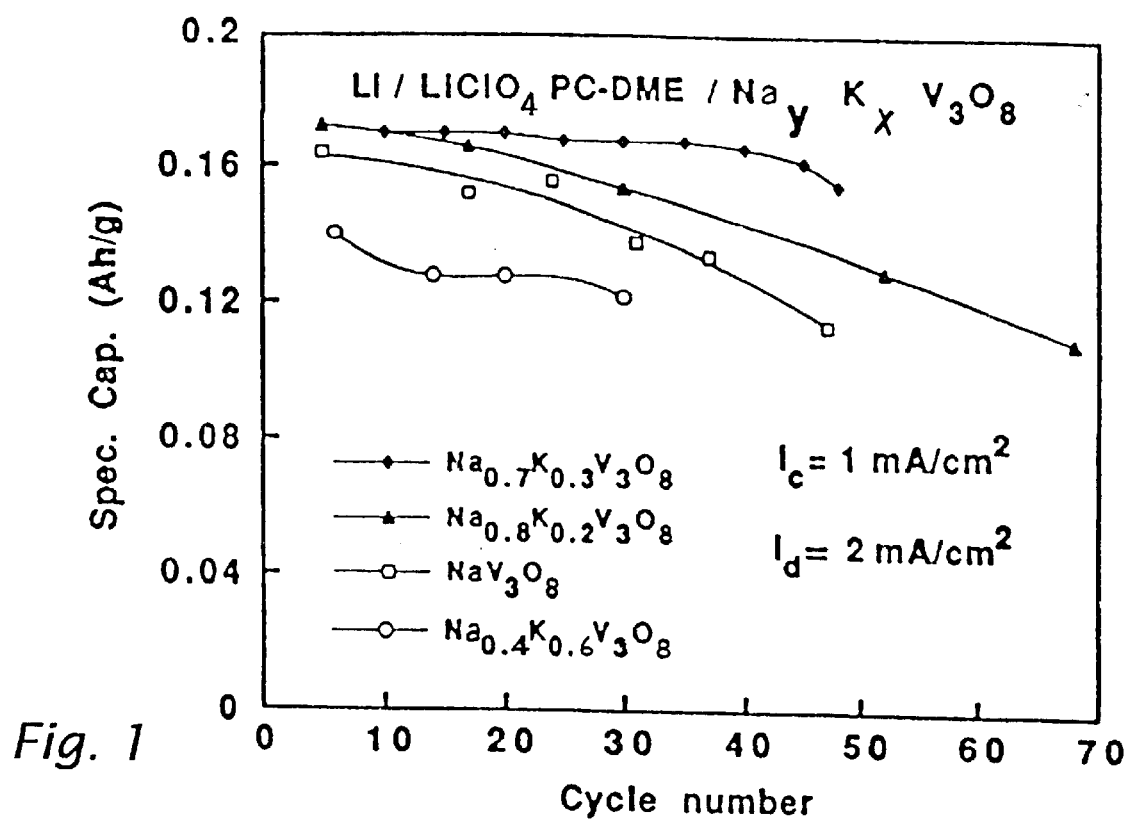
FIG. 1 contains curves showing the influence of the $Na^+/K^+$ ratio on the cycling characteristic in $LiClO_4$ Propylene Carbonate (PC) Dimethoxyethane (DME) for a cell: Li/LiC10$_4$ PC-DME/Na$_y$K$_x$V$_3$O$_8$. $I_d$=2 mA/cm$^{-2}$, $I_c$=1 mA/cm$^{-2}$. Voltage limits: 1.8–3.2 V.

In a preferred method, a vanadium metal oxide composition is prepared having a unit structure $A_yZ_xV_aO_b$ where A and Z are each selected from the group of alkali metals, a is greater than 1, b is greater than a and where the sum of x and y is less than 2. These vanadium oxides are characterized by the ability to insert lithium in an electrochemical reaction. A particularly preferred vanadium-oxide composition is prepared having a unit structure of the nominal general formula $Na_yK_xV_3O_8$, or represented by the nominal general formula $Na_{(1-x)}K_xV_3O_8$ which is a reversible cathode for lithium based electrochemical cells. The term, nominal general formula, refers to the situation where varying amounts of the elements may be present in a particular batch of product. For example, the general formula $Na_{1-x}K_xV_3O_8$ represents the nominal desired product; however, if the sum of Na and K exceeds 1 mole equivalent and if some $V^{+4}$ is also present, the more general formula $(Na_{1-x}K_x)_{1+y}V^{+4}{}_tV^{+5}{}_{3-t}O_{8+y/2-t/2}$, could be adopted. Therefore the product nominally, with slight or small variations, corresponds to the stated general formula.

The Na—K compositions of the invention are able to insert lithium in, and release it from, the basic structure with good energy, power and cycling capability. The method of the invention will first be described with reference to the preparation of $Na_{1-x}K_xV_3O_8$ having 1 mole equivalent of potassium and sodium for each 3 moles of vanadium pentoxide.

The $Na_{1-x}K_xV_3O_8$ is prepared in a solution process. The process begins with forming a mixture comprising vanadium pentoxide, sodium hydroxide and potassium hydroxide, each in an amount sufficient to provide approximately the desired stoichiometric amount of the elements in the final product. The overall reaction may be represented as follows: $xKOH + (1-x)NaOH + 3/2 V_2O_5 = Na_{1-x}K_xV_3O_8$. As can be seen, the stoichiometric ratio of sodium and potassium to vanadium in the reactants is 1:3 of Na+K:V. This corresponds to 1 mole equivalent of combined sodium (Na) and potassium (K) for each 3 moles equivalent of vanadium pentoxide ($V_2O_5$). The KOH and NaOH are mixed together and then the $V_2O_5$ is added. This forms a slurry. By maintaining the slurry above room temperature and by stirring, a color change is observed. The color change indicates completion of the reaction and the precipitate is recovered. It is filtered, washed and dried under vacuum to give a dispersed powder.

EXAMPLE

Na—K vanadates were prepared in a reaction having the overall general formula $yNaOH + xKOH + 3/2 V_2O_5 = Na_yK_xV_3O_8$, where the sum of x plus y was less than 2 and as close to one as possible, along with the vanadium and oxygen being as close to the stated nominal values as possible. In the case where y=0.7 and x=0.3, the reaction becomes $0.7 NaOH + 0.3 KOH + 3/2 V_2O_5 \rightarrow Na_{0.7}K_{0.3}V_3O_8 + 1/2 H_2O$.

Vanadium pentoxide of the general formula $V_2O_5$ is obtainable from any number of suppliers including Kerr McGee, Johnson Matthey or Alpha Products of Danvers, Mass. It had a melting point of about 690° C., decomposed at 1750° C., a particle size of less than about 60 mesh (250 microns) and had a specific gravity of 3.357 grams per cc at 18° C. It was a yellow to yellow-red crystalline powder. Vanadium pentoxide has a CAS number of 1314-62-1.

Alternatively, the vanadium pentoxide may be prepared from ammonium metavanadate ($NH_4VO_3$). The ammonium metavanadate is heated to a temperature of about 400° C. to about 450° C. to decompose it to vanadium pentoxide ($V_2O_5$), usually in a crystalline form (in the presence of oxygen). The ammonium metavanadate is a solid crystalline material, usually a white to yellow powder. Processes for production of ammonium metavanadate are known in the art and will not be repeated here. Such processes are described in U.S. Pat. Nos. 3,063,795 and 3,063,796; and processes for preparation of ammonium metavanadate and then for production of vanadium pentoxide therefrom are described in U.S. Pat. Nos. 3,728,442, 4,061,711 and 4,119,707, each of which is incorporated herein by reference in its entirety.

The hydroxides, KOH (potassium hydroxide) and NaOH (sodium hydroxide) are well known and are obtainable from a number of suppliers.

Potassium hydroxide (KOH), also known as caustic potash, has a molecular weight on the order of 56 and is available in the form of white or slightly yellow lumps, rods, pellets, or flakes having a crystalline fracture. It rapidly absorbs moisture and carbon dioxide from the air and deliquesces. It has a melting point on the order of about 360° C. It is soluble in about 0.9 parts water, about 0.6 parts boiling water, and about 3 parts alcohol. A 0.1 M aqueous solution has a pH of 13.5.

Sodium hydroxide (NaOH), also referred to as caustic soda, or sodium hydrate, has a molecular weight of about 40. It is sold as lumps, sticks, pellets, chips, etc. and is available as a fused solid with crystalline fracture. It is generally white in color and in the form of deliquescent pieces; since like potassium hydroxide it readily absorbs carbon dioxide and water from air. Its specific gravity is about 2.13. It has a melting point of about 318° centigrade and a boiling point of about 1,390° centigrade. Commercial grades usually contain 97% to 98% NaOH. One gram of sodium hydroxide dissolves in 0.9 milliliters of water, 0.3 milliliters boiling water, 7.2 milliliters abs. alcohol. Considerable heat is generated while dissolving as in the case of sodium hydroxide. Volumetric sodium hydroxide solutions must be protected from air to avoid formation of the carbonate. The pH of a 0.05% w/w solution is about 12, of a 0.5% solution about 13, of a 5% solution about 14. The 5% solution has a freezing point of −40° centigrade and a boiling point of 102° centigrade. The boiling point increases with increasing concentration of sodium hydroxide in the water solution. An aqueous solution containing the KOH and NaOH was prepared by mixing together suitable proportion of 1M solutions of the stated alkalis.

In this example ($Na_{0.7}K_{0.3}V_3O_8$) approximately 4.89 milliliters of 1.85M concentration NaOH and 2.46 milliliters of 1.58M concentration KOH were mixed together. The observed pH was as determined by the hydroxides as explained above. Then 3.53 grams of $V_2O_5$ was progressively added and the mixture had the consistency of a slurry. In order to facilitate dissolution of the $V_2O_5$ the mixture was stirred. Stirring also facilitated progress of the reaction to complete conversion of reactants to $Na_{1-x}K_xV_3O_8$. The characteristic yellow color of $V_2O_5$ slowly turned to a deep brown-red color. The progress of the reaction was also followed by monitoring a change in pH. At the end of the reaction, the pH is neutral. The product precipitate was filtered, washed with distilled water and dried to remove occluded water.

The temperature of reaction is not critical, however, the rate at which the reaction proceeds is temperature dependant. At higher temperatures, the reaction is faster. From a practical view, it is best to maintain the temperature at about room temperature, 15° C., or greater. It is possible to conduct the reaction at higher temperatures and, theoretically up to the boiling point of the hydroxide mixture. Good results were achieved by conducting the reaction at 80–90° C. while under ref lux. The time to conduct the reaction was not determined exactly, normally, 24 hours was allowed for. As stated, the time varies, as temperature increases, time decreases. Good results were obtained using the preferred NaOH/KOH ratio of 7/3 and as close as possible to the stoichiometric amount of $V_2O_5$ as per the earlier stated reaction equation.

The precipitate, which has the characteristics of a gel, is washed with water in order to dissolve traces of any unreacted reagents. To drive all water off, heating for several hours at 300° C. is preferred. After this procedure, no milling is necessary to achieve acceptable particle size. The material has a typical particle size of about 1 μm as determined by SEM experiments and a surface area of about 43 square meters per gram. These values were measured after drying at 300° C. The particle size is the average diameter of the particles as they appear in SEM and the surface area is the BET surface area.

Other formulations were prepared by varying the units of x in a range of $0 \leq x \leq 1$ in the equation: $(1-x) NaOH + x KOH + 3/2 V_2O_5 \rightarrow Na_{1-x}K_xV_2O_5$. Examples of prepared formulations include, but were not limited to, x=1 corresponding to $KV_3O_8$; x=0.6 corresponding to $Na_{0.4}K_{0.6}V_3O_8$; and x=0.4 corresponding to $Na_{0.6}K_{0.4}V_3O_8$; and x=0 corresponding to $NaV_3O_8$. The $KV_3O_8$ gel precipitate is orange/red.

The recovered product $Na_{1-x}K_xV_3O_8$, $0 \leq x \leq 1$, was then used as an active material for an electrochemical cell. The active material is operable with both liquid and solid (i.e., polymeric) electrolytes. Performance of the cell containing such cathode active material is as shown in FIGS. 1 to 5, 12, 14, and 16; characteristics of the material are as per FIGS. 7–10, 11, 13, and 15. The method for preparing such cells will now be described.

Preparation of Cathode and Cell

Figure 6:
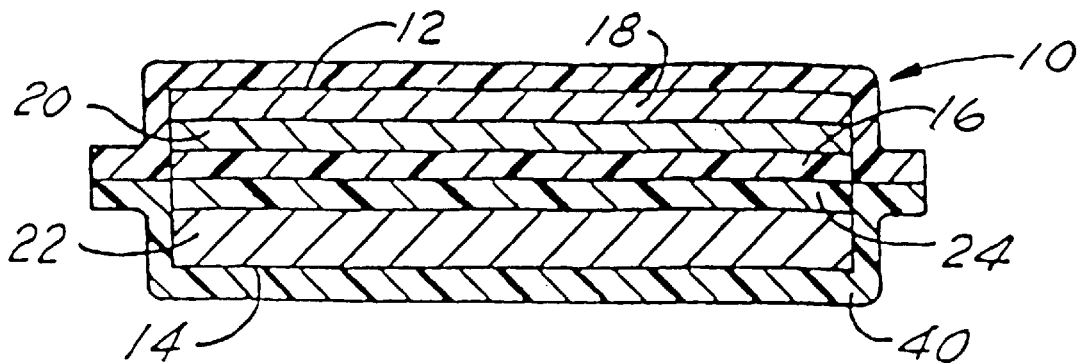
FIG. 6 is an illustration of a cross-section of a thin battery or cell embodying the invention.
Figure 7:
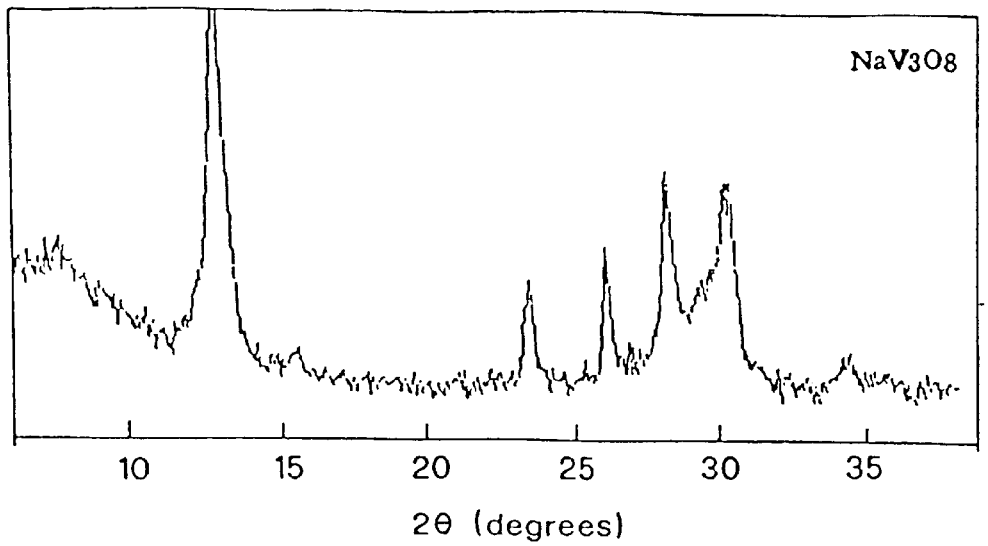
FIGS. 7, 8, 9, and 10 are x-ray patterns of comparative $NaV_3O_8$ and the $Na_{1-x}K_xV_3O_8$ compounds of the invention after drying at 300° C. (Note in FIG. 10, for $Na_{0.4}K_{0.6}V_3O_8$ the formation of $KV_3O_8$ is evidenced by the peak at $2\Theta$=11.70°. This peak is not present in other compositions of FIGS. 7 ($NaV_3O_8$), 8 ($Na_{0.7}K_{0.3}V_3O_8$), and 9 ($Na_{0.6}K_{0.4}V_3O_8$).
Figure 8:
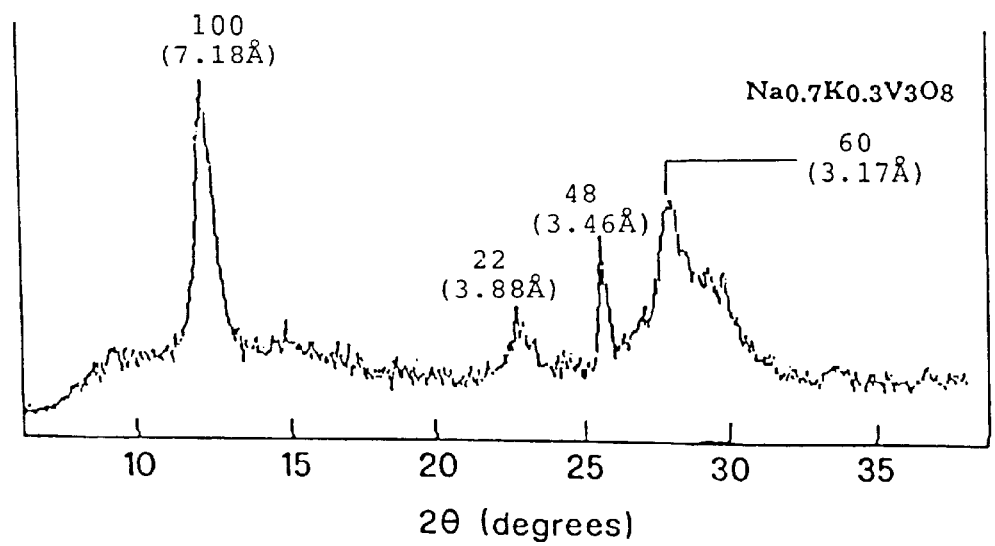
Figure 9:
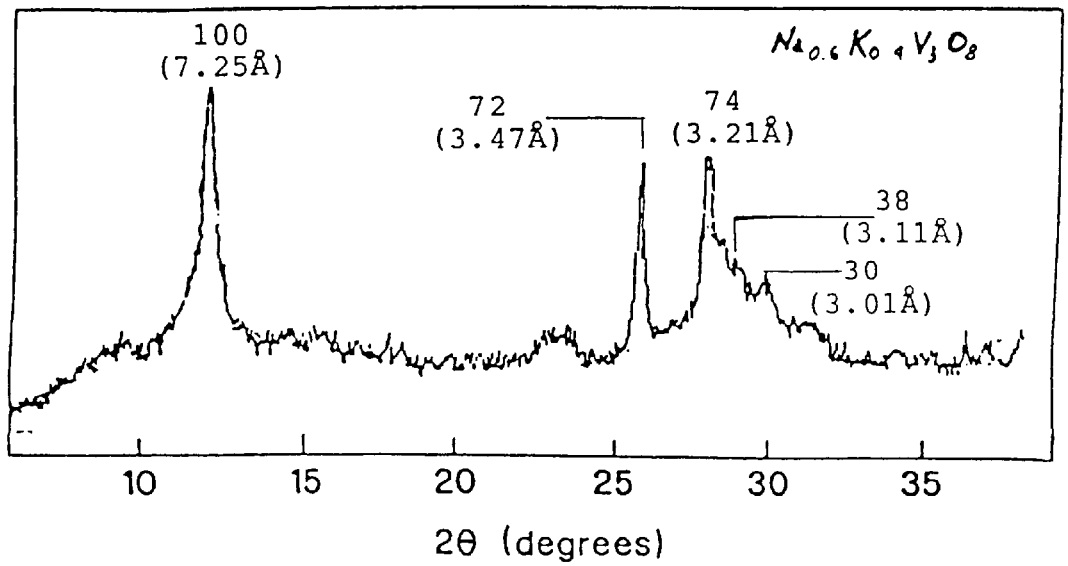
Figure 10:
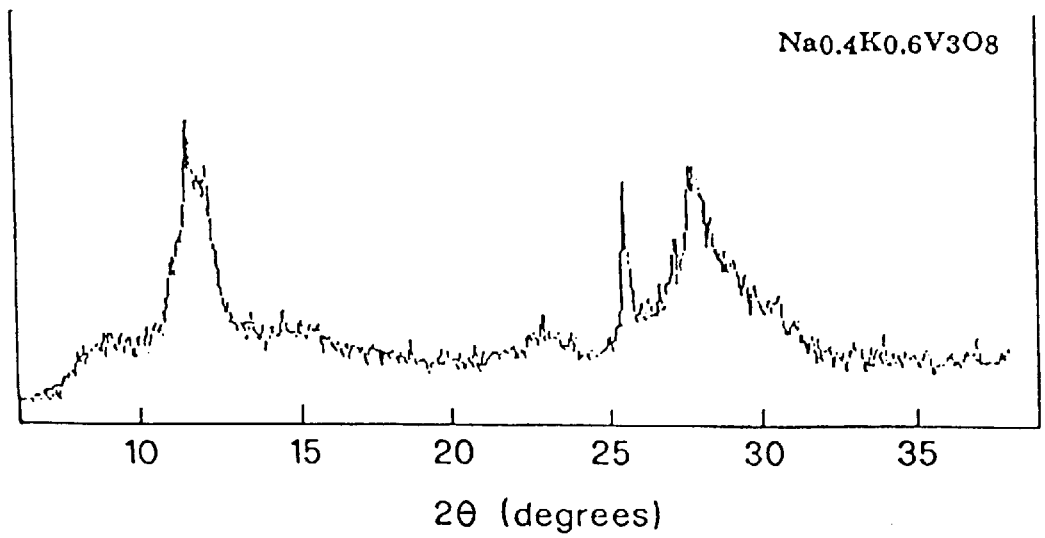

The cathode active material of the invention is used to prepare cathodes for lithium based electrochemical cells. FIG. 6 shows an electrochemical cell or battery 10 which has a negative electrode (anode) side 12, a positive electrode (cathode) side 14, and an electrolyte or electrolyte/separator 16. In accordance with common usage, a battery may consist of one cell or multiple cells. The negative electrode is the anode during discharge, and the positive electrode is the cathode during discharge. The negative electrode side includes current collector 18, typically of nickel, stainless steel, and/or copper foil, and a body of negative electrode material 20. The negative electrode material 20 is sometimes simply referred to as the negative electrode or negative electrode composition. The negative electrode side 12 may consist of only a metallic electrode 20 without a separately distinguishable current collector 18. The positive electrode side 14 includes current collector 22, typically of aluminum, nickel, stainless steel, and/or copper foil, or such foils having a protective conducting coating foil, and a body of positive electrode material 24. The cathode composition 24 has a typical composition as set forth in Table 1 and includes the vanadates of the invention as the active material. The positive electrode material 24 is sometimes simply referred to as the positive electrode or positive electrode composition. The electrolyte 16 is typically a solid or liquid electrolyte. Suitable liquid or solid electrolytes are known with polymer electrolytes presently being favored. A variety of liquid, solid and polymer electrolytes are described in U.S. Pat. Nos. 4,009,052, 4,118,550, 4,792,504, 4,830,939, 4,990,413, 5,037,712, and 5,229,225 each of which is incorporated herein by reference in its entirety. The preferred electrolyte is a solid organic polymer matrix containing an tonically conducting powder or liquid with an alkali metal salt and the liquid is an aprotic polar solvent. Other electrolytes are liquid with dissolved metal salt usually used with a separator between the electrodes. Cell 10 also includes a protective covering (40) which functions to prevent water and air from contacting the reactive layers of the cell 10.

Cell 10 is preferably a laminar thin cell type including a lithium anode (negative electrode 20). Laminar thin-cell batteries containing lithium anodes are known in the art, and it will be appreciated that the cell can include various constructions such as bi-faced or bi-polar cell designs. Examples of cell constructions include a "jelly roll" or a fan folded laminate strip design as described in U.S. Pat. No. 4,879,190 incorporated herein by reference in its entirety.

Because the cell utilizes a lithium anode layer 20, it is necessary to manufacture the cell in a water (humidity) free environment. Lithium is extremely reactive with water and if reacted, a passivation layer can form on the surface of the anode layer, reducing the efficiency of the layer, and increasing cell impedance. Accordingly, it is particularly desirable to manufacture the cell in an environment having a relative humidity at room temperature of less than 2% (less than 300 ppm water). An environment containing between 1 ppm and 50 ppm water, and preferably less than 1 or 2 ppm water, produces a particularly efficient cell.

Cells can be prepared with a variety of electrolytes, current collectors and cathode compositions. The anode is typically metallic lithium. Table 1 contains one exemplary cathode composition. The cathode composition is typically a highly viscous paste or gel applied onto the micro-roughened surface of current collector 22. In one embodiment, cathode composition 24 is paste-like in consistency and includes the vanadate active cathodic material and an electrically conductive filler or an electrically conductive polymer such a polypyrrole, polyacetylene, polyaniline, etc.; and an ionically-conductive electrolyte. The electrically conductive filler is often graphite, carbon black, or the like, generally referred to as carbon powder or carbon particles. Certain conductive polymers (which are characterized by a conjugated network of double bonds) like polypyrrole and polyacetylene may also be used for the electrically conductive filler.

TABLE 1

| TYPICAL CATHODE COMPOSITION | PERCENT WEIGHT |
| --- | --- |
| Active Material ($Na_yK_xV_3O_8$; $Na_{1-x}K_xV_3O_8$) | 45.0 |
| Carbon | 10.0 |
| Propylene Carbonate (PC) | 33.0 |
| PolyEthylene Oxide (PEO) | 1.0 |
| PolyEthyleneGlycolDi-Acrylate (PEGDA) | 9.0 |
| TriMethylpolyEthylene Oxide TriAcrylate (TMPEOTA) | 2.0 |

The cathode composition containing the $Na_yK_xV_3O_8$ active material of the invention was coated onto metal foil, followed by curing. Then the cathode was assembled in a cell comprising a lithium anode and a liquid or a polymeric electrolyte.

In summary, compounds at nominal composition $Na_{1-x}K_xV_3O_8$ were prepared by adding 1.5 moles of $V_2O_5$ to a solution containing x moles of KOH and 1-x moles of NaOH. This reaction may be carried at room temperature or to speed it up, under reflux conditions at 80° C. to 90° C. A red-brown gel was obtained in a few hours and, after washing and drying, a voluminous orange-red powder was recovered. To drive all $H_2O$ out, heating for several hours at 300° C. was applied.

The cathode and cell preparation have already been described. Typical cathode loading were 12–16 mg/cm$^2$ (active material). The cathodes were housed in laboratory button cells with very limited electrolyte volume. Such liquid solutions as $LiClO_4$-PC/DME, $LiClO_4$-EC/DMC/DEC or $LiAsF_6$-EC/2MeTHF were used. In addition, some experimental cells had polymeric electrolytes based on $LiClO_4$-EC/PC/PAN (casting technique) or based on UV induced polymerization. With the polymeric electrolytes, cathodic films having the typical composition: 30% active material, 50% electrolyte, 10% PEO, 10% acetylene black, were used.

Some experimental cells described above with a hole in the base which allowed the use of a reference electrode (Li) were also tested. For the impedance measurements, the latter afforded separate evaluation of the anode and cathode contributions. Impedance spectroscopy tests were run to measure the Li+ diffusion coefficients.

Figure 4:
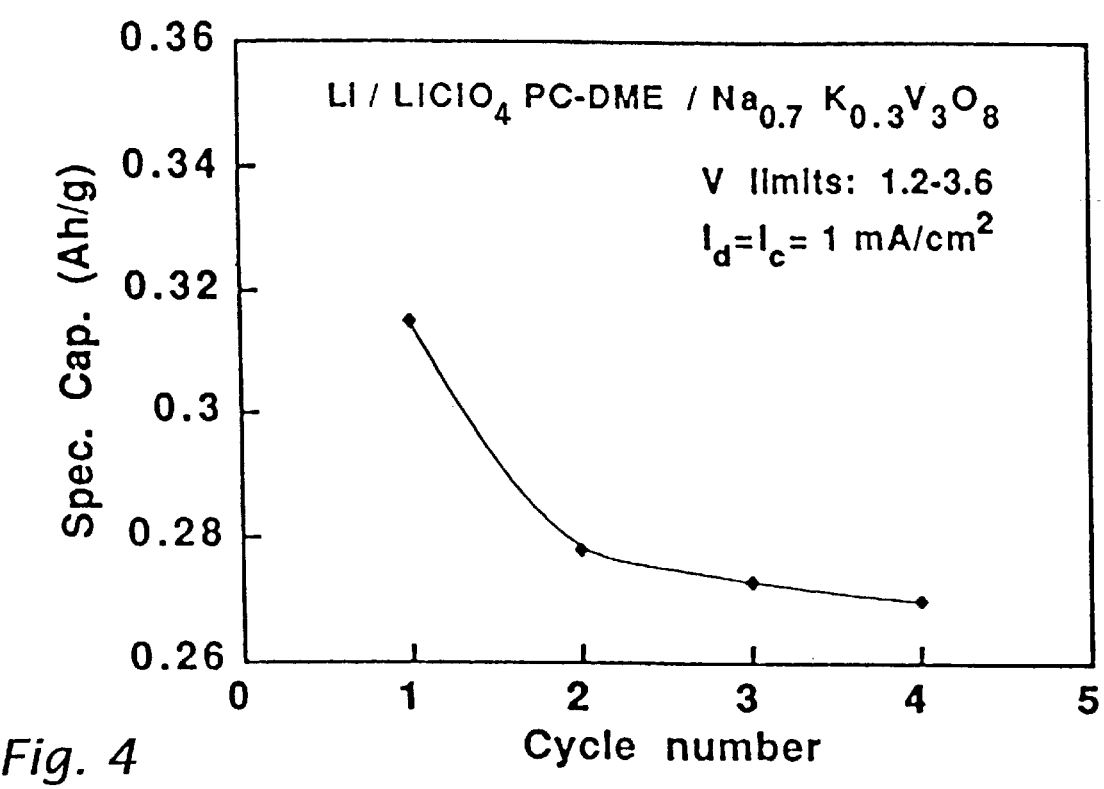
FIG. 4 contains a curve showing specific capacity as a function of cycle number in deep cycles (high d.o.d.—94% in the first discharge) pertinent to resistance to overdischarge for a cell: Li/LiC10$_4$ PC-DME/Na$_{0.7}$K$_{0.3}$V$_3$O$_8$; V limits 1.2–3.6; $I_d$=$I_c$=1 mA/cm$^2$.
Figure 5:
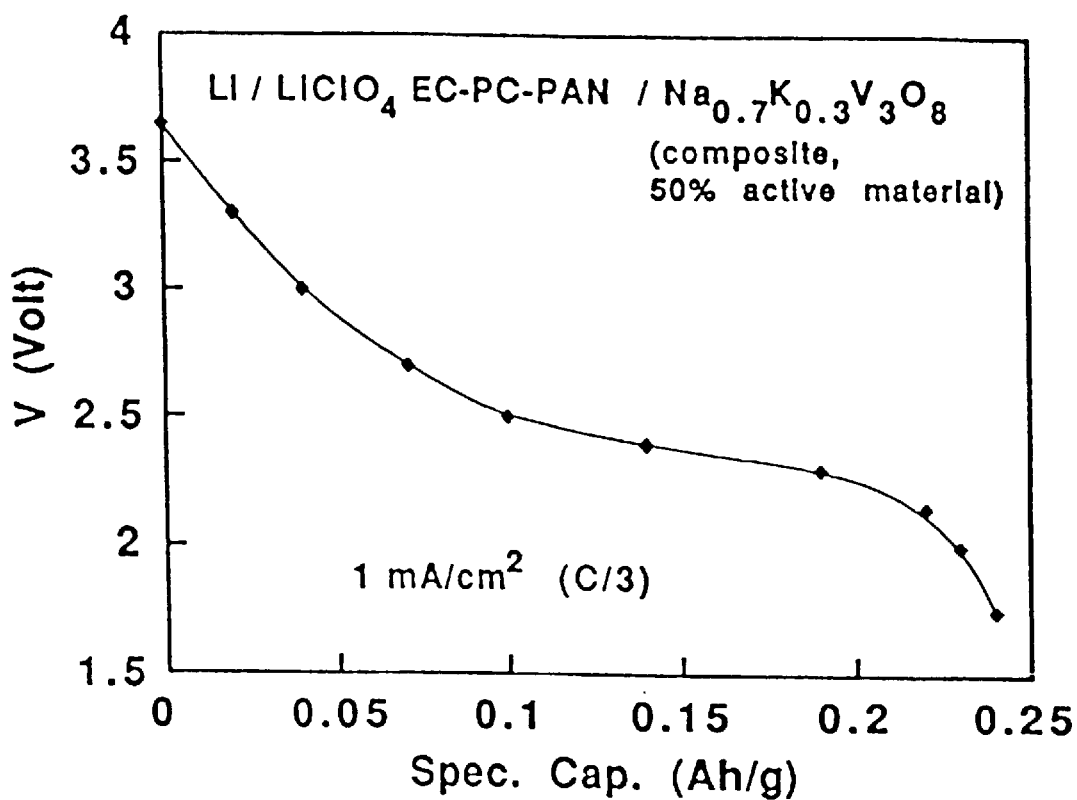
FIG. 5 contains a curve showing a first discharge in a polymeric electrolyte, where EC=Ethylene Carbonate and PAN=Polyacrylonitrile. The designation C/3 means that the cell is discharged at the 3 hour rate; i.e., the current (mA) is ⅓ of the capacity (mAh) for a cell: Li/LiC10$_4$ EC-PC-PAN/Na$_{0.7}$K$_{0.3}$V$_3$O$_8$ (composite 50% active material); 1 mA/cm$^2$ (C/3).

As can be seen in the Figures, the $Na_{1-x}K_xV_3O_8$ having x =0.3 or x =0.4 demonstrated superior performance compared to $NaV_3O_8$. Other mixed Na vanadates such as x =0.2, x >0, x ≦1 also perform well. The performance in the liquid electrolyte $LiClO_4$/PC-DME of FIGS. 1–4 was good as was the performance with a polymeric electrolyte $LiClO_4$ EC-PC-PAN (FIG. 5).

Figure 11:
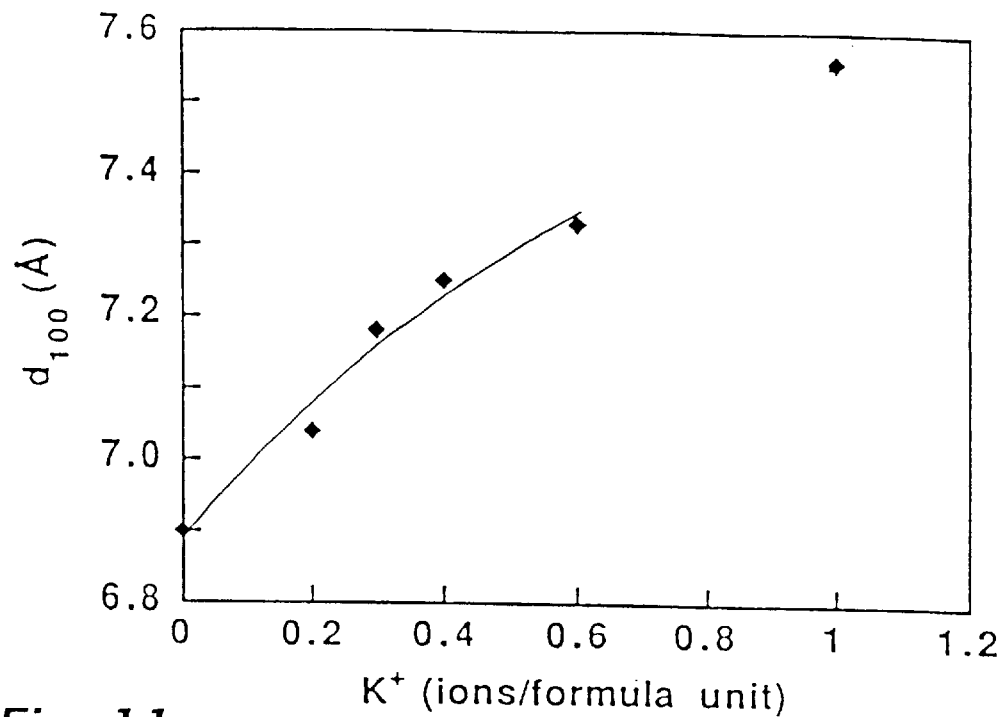
FIG. 11 is a graph of interlayer distance as a function of the nominal K+ content in different $Na_{1-x}K_xV_3O_8$ compounds.

In FIGS. 7–10, the x-ray diffractograms at different compositions are shown. The nominal $Na_{0.7}K_{0.3}V_3O_8$ compound is essentially single-phase as the $d_{100}$ peak of $K_{1+x}V_3O_8$ (at $2\vartheta=11.7°$) is not visible. The same apply to $Na_{0.6}K_{0.4}V_3O_8$, while in $Na_{0.4}K_{0.6}V_3O_8$ the formation of some $K_{1+x}V_3O_8$ is evident. The progressive increase of the interlayer distance brought about by the K+ substitution for Na+ is shown in FIG. 11. $Na_{1+x}V_3O_8$ prepared by this solution technique has a shorter interlayer distance with respect to the high temperature form (6.90 vs. 7.08 Å). Such a distance becomes 7.18 Å in $Na_{0.7}K_{0.3}V_3O_8$. A gain of ~0.3 Å is relevant as it corresponds to ~40% of the ionic radius of Li+.

Figure 2:
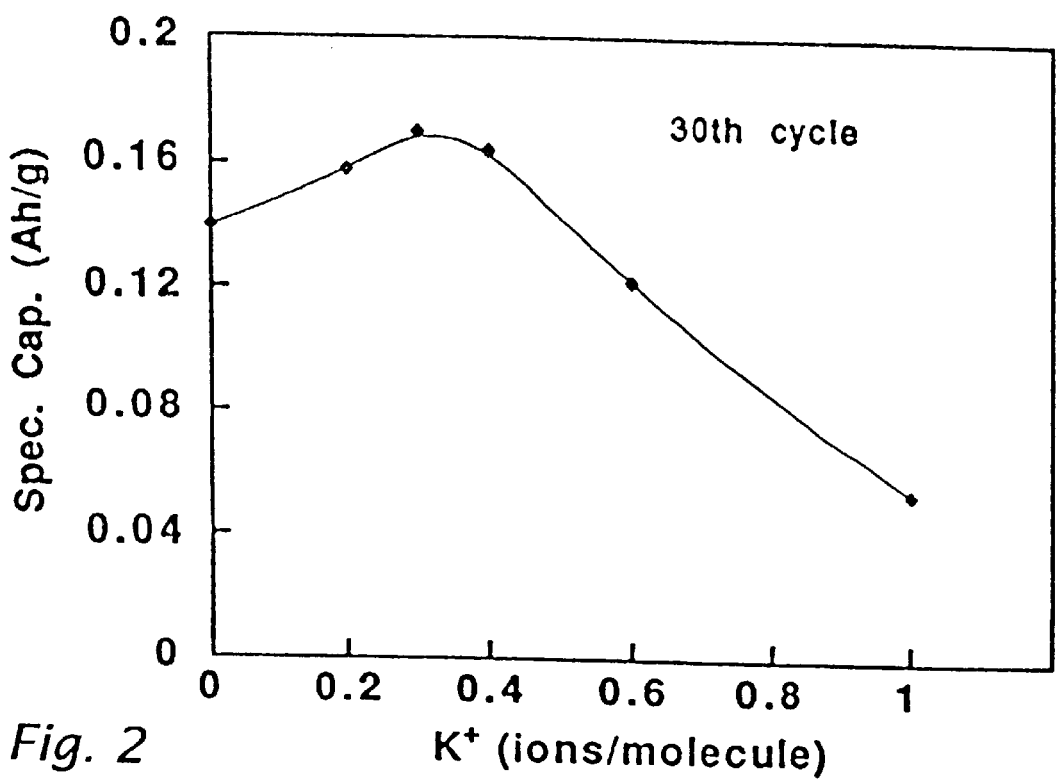
FIG. 2 contains a curve showing the influence of the $K^+$ content on the specific capacity at the 30th cycle. Other conditions are as in FIG. 1.
Figure 12:
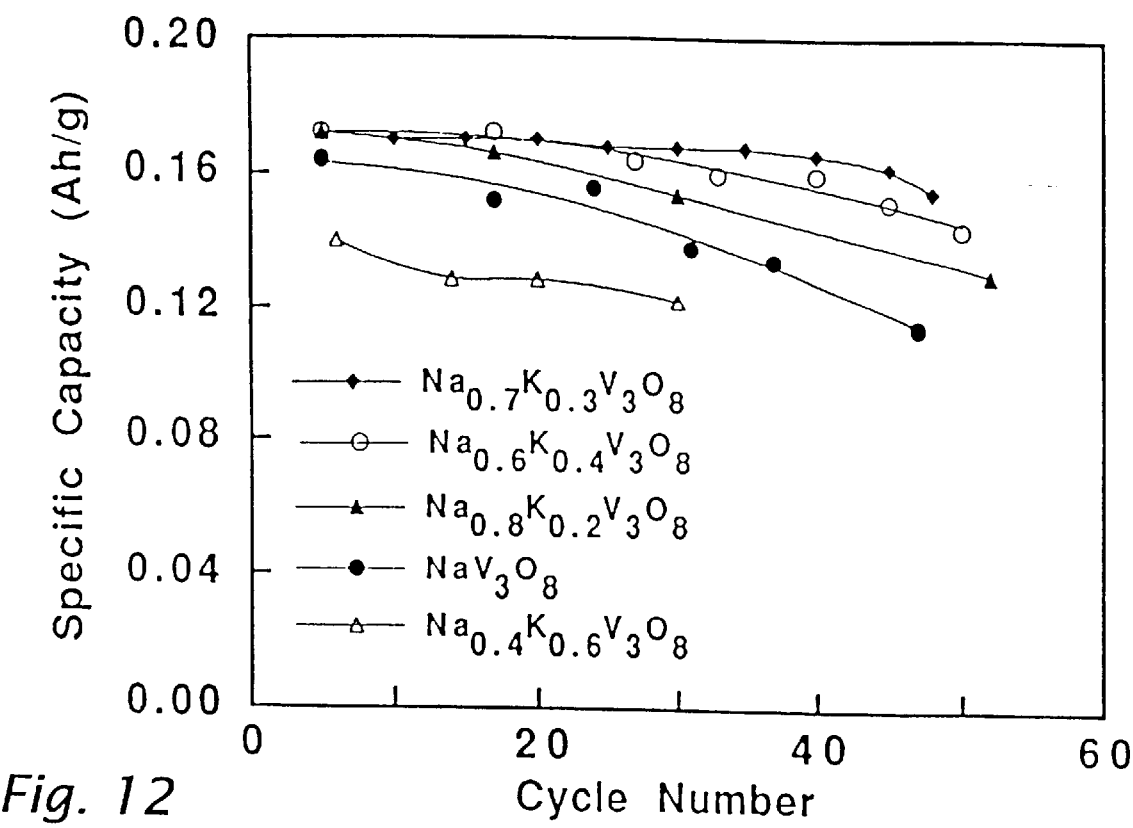
FIG. 12 shows cycling behavior of different $Na_{1-x}K_xV_3O_8$ compounds in $LiC10_4$ PC/DME as per the conditions of FIG. 1. Very similar results were obtained with other liquid electrolytes. Voltage limits: 1.8–3.2 V.

To see how these structural changes affect the performance of the cathodes, button cells were cycled at the regime: $I_d=2$ mA/cm$^2$, $I_c=1$ mA/cm$^2$(~1 h and ~2 h rate, respectively). In FIG. 12, the added results of the cycling tests are shown. FIG. 12 is similar to FIG. 1 and demonstrates the same trends. Increasing capacities have been obtained when passing from $NaV_3O_8$ to $Na_{0.7}K_{0.3}V_3O_8$ and $Na_{0.6}K_{0.4}V_3O_8$. Especially for the former a stabilized capacity of ~0.17 Ah/g was measured in the first 50 cycles. With an average voltage of 2.4 V this corresponds to a specific energy of 406 Wh/Kg (active material only), which is an interesting value at the 1 h rate. At higher K+ contents the capacities start to decrease, as also shown in FIG. 2, where $K_{1+x}V_3O_8$ too is compared. A likely explanation is that up to the composition of $Na_{0.6}K_{0.4}V_3O_8$ the interlayer distance is enlarged without formation of $K_{1+x}V_3O_8$. This vanadate starts to appear at higher K+ concentrations and, as its content becomes significant (e.g. in the nominal composition $Na_{0.4}K_{0.6}V_3O_8$), the capacity has a corresponding drop.

Limited K+ substitutions for Na+ still allow the pristine unit cell configuration of $Na_{1+x}V_3O_8$ to be maintained. However, the larger radius of K+ causes distortion, as clearly indicated by the reduction in crystallinity when the K+ content is increased (see shortening of the $d_{100}$ peak in FIGS. 7–10). In $Li_{1+x}V_3O_8$, an average Li—O bond length of 2.17 Å has been measured. For $Na_{1+x}V_3O_8$, such calculation has not been made, but for the similar $Na_{2-x}V_6O_{15}$ the average Na—O bond length is 2.50 Å. In $K_{1+x}V_3O_8$, the average K—O distance is 3.11 Å and a peculiar 12-fold coordination is observed between K+ and oxygen atoms in the layers. It is evident from these data, that, above a certain K+ content (>0.4 in $Na_{1+x}K_xV_3O_8$), the original unit cell of $Na_{1+x}V_3O_8$ is no longer stable. As a consequence, $K_{1+x}V_3O_8$ is also formed x $Na_{1+x}K_xV_3O_8$.

Figure 13:
FIG. 13 is a SEM scanning electron micrograph of $Na_{0.7}K_{0.3}V_3O_8$ at 20,000 magnification.

On the basis of this screening with several Na/K vanadates, attention was focused on $Na_{0.7}K_{0.3}V_3O_8$ and some further characterization was carried out on this material. First of all, its morphological features were determined by BET and SEM experiments. Its surface area 43 m$^2$/g, is very close to that of $Na_{1+x}V_3O_8$ (40 m$^2$/g). Instead, the particle shape is rather different in the two compounds. $Na_{1+x}V_3O_8$ is made up of tiny needles, while in $Na_{0.7}K_{0.3}V_3O_8$ fluffy particles of 1–2 $\mu$m appear (FIG. 13). There was no need to grind the material obtained after drying to have this particle size.

Figure 14:
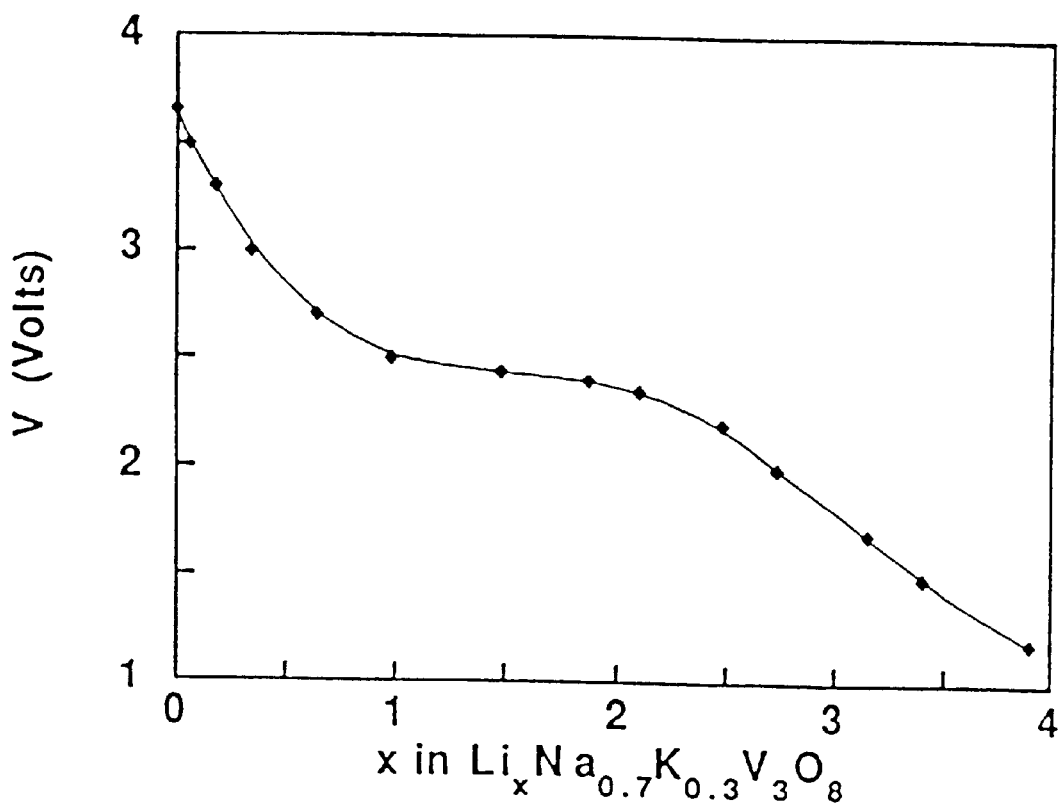
FIG. 14 is a voltage-composition curve for $Na_{0.7}K_{0.3}V_3O_8$ at 0.2 mA/cm$^2$ in $LiC10_4$ PC/DME.

A low-rate first discharge is shown in FIG. 14. Its profile is fairly similar to that of the parent compound $Na_{1+x}V_3O_8$, with the absence of true plateaus, as is typical of these low-temperature forms. However, a maximum Li+ uptake of 3.9 Li+ per molecule could be obtained (to 1.2 V) vs. 4.5 for $Na_{1+x}V_3O_8$. In other words, 8 sites are available in the unit cell of $Na_{0.7}K_{0.3}V_3O_8$ (containing 2 molecules), whereas 9 sites are available in $Na_{1+x}V_3O_8$, as the bulkier K+ ions impose a capacity penalty. Indeed, the interlayer distance is larger by ~4% in the former, but, at the same time, the average ionic radius has increased by 10% (0.7* 1 +0.3* 1.3=1.1 Å). So, ionic diffusion is certainly favored in $Na_{0.7}K_{0.3}V_3O_8$, while this is not so in terms of site number.

Figure 3:
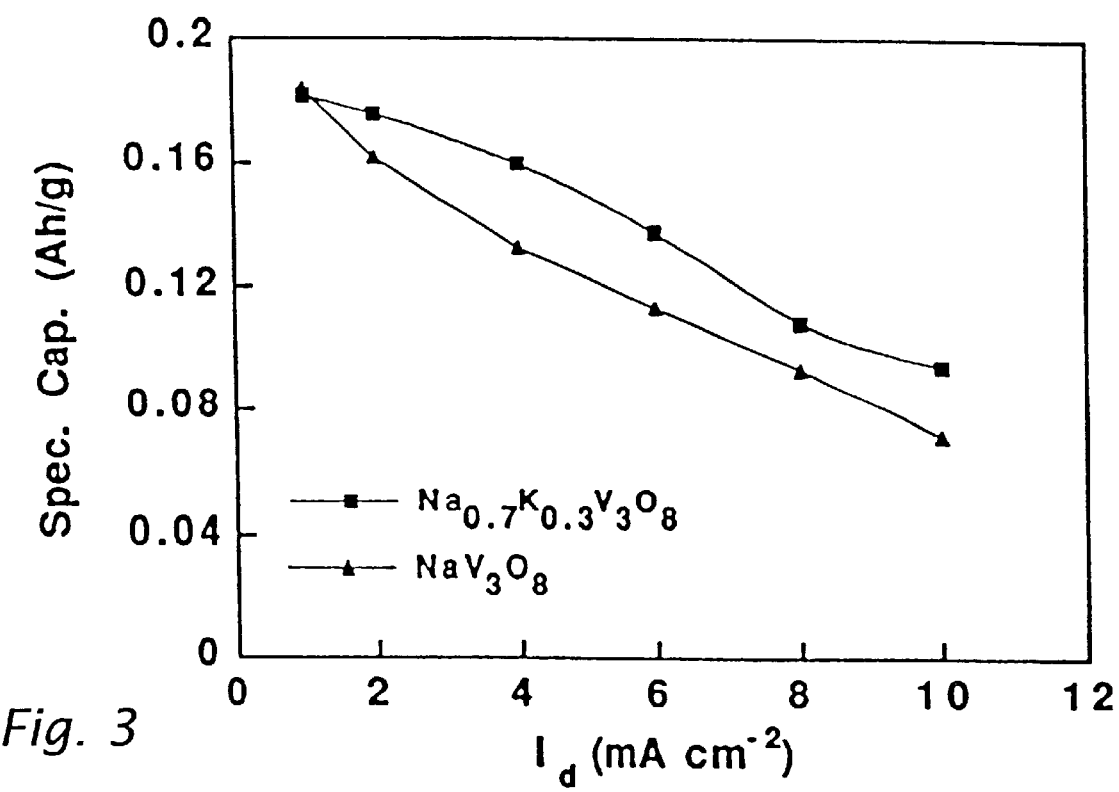
FIG. 3 contains curves showing rate capability of $Na_{0.7}K_{0.3}V_3O_8$ and $NaV_3O_8$. Other conditions are as in FIG. 1.

To a 2.0 V cut-off, from FIG. 14 the following semi-theoretical values may be calculated: 0.23 Ah/g, 2.57 V (average), 604 Wh/Kg, 1992 Wh/l (based on a crystallographic density of 3.3 g/cm$^3$). As observed above, a satisfactory portion of these values may still be recovered at high rates (FIGS. 3 and 12).

To ascertain the sensitivity of this cathode to overdischarge, cycling tests with a 1.2 V cut-off were run. As shown in FIG. 4, after the capacity loss at the end of the first cycle (typical of these vanadates), a rather steady capacity was obtained. A high reversibility had also been observed with the low temperature forms of $Li_{1+x}V_3O_8$ and $Na_{1+x}V_3O_8$. The limited long-range order certainly plays a role. $Li_{1+x}V_3O_8$ is amorphous, while $Na_{1+x}V_3O_8$ is ~6 times less crystalline than its high temperature counterpart. As already stressed, K+ substitution for Na+ further reduces the crystallinity so creating the microstructural conditions favoring a well reversible Li+ uptake/removal. In the experimental conditions of FIGS. 1 and 12, 4 Li+/unit cell can reversibly be cycled for the composition $Na_{0.7}K_{0.3}V_3O_8$.

Figure 15:
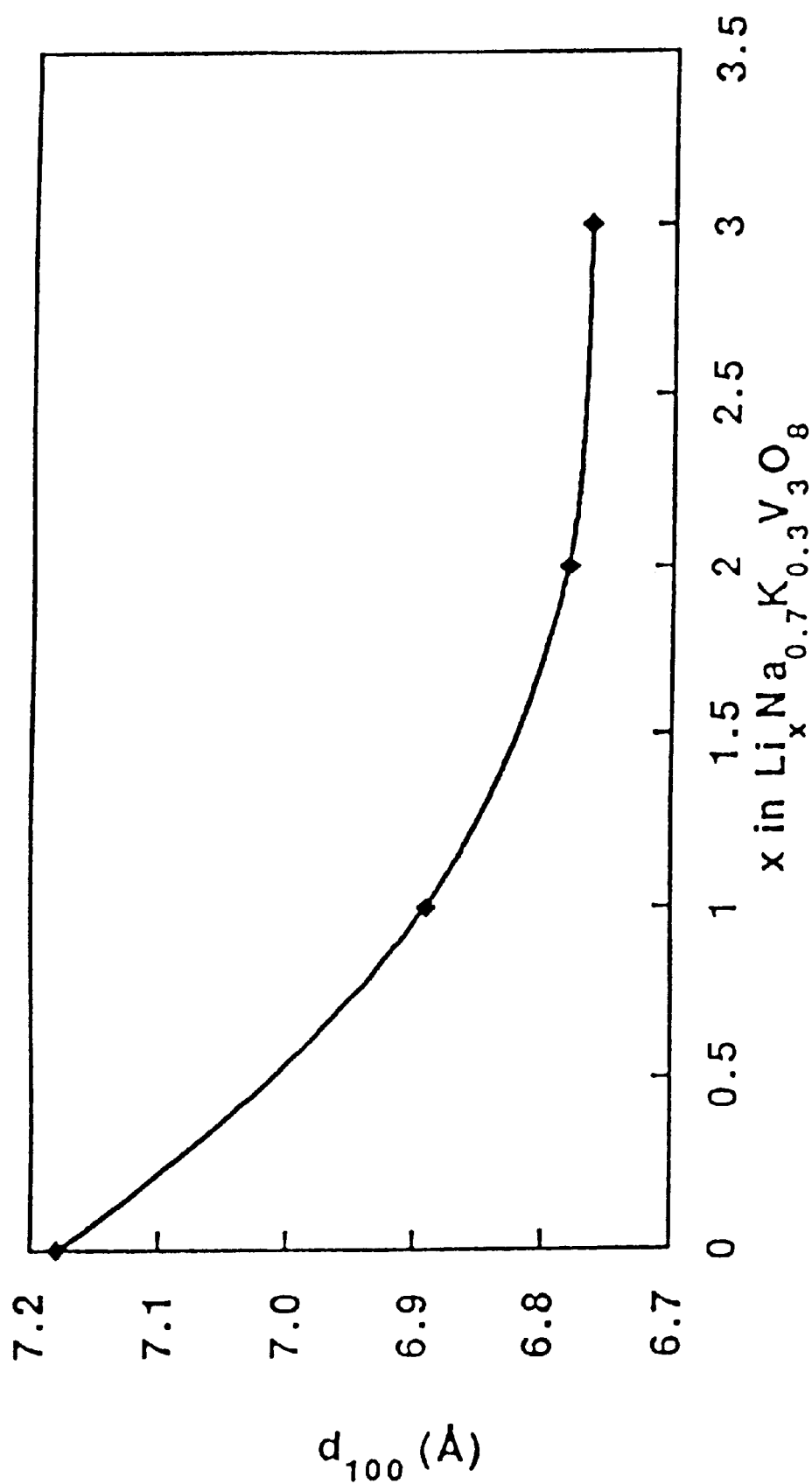
FIG. 15 shows variations of the interlayer distance of $Na_{0.7}K_{0.3}V_3O_8$ with the Li+.

To see the impact of overdischarge on the structure, the interlayer distance at different intercalation levels and after recharge was determined. FIG. 15 shows a decrease of $d_{100}$ upon intercalation due to the interaction of Li+ with neighboring oxygen atoms in the layers. For x=3, a 5.7% shrinking of the layers occurs. This limited shrinking helps the structure to maintain its integrity and probably accounts for the higher cell life of this material. A cathode discharged to x=3 and, then recharged, has a $d_{100}$ of 6.95 Å, i.e. lower than the pristine one. This value might be suspicious, indicating the possible partial substitution of Li for Na+/K+. This possibility was ruled out by remeasuring $d_{100}$ after some deep discharge cycles (see, e.g. FIG. 4) and final charge. The value of 6.95 Å was again obtained. So, the decrease is only due to Li+ which is no longer recoverable after the first intercalation. From FIG. 4, a decrease of 0.040 Ah/g may be calculated between the first and the second discharge. From FIG. 15 one sees that $d_{100}=6.95$ Å corresponds to x=0.5, i.e. to 0.043 Ah/g. The two values agree fairly well. Obviously, a further Li+ de-intercalation would have occurred if a higher V limit and a lower current density had been imposed.

In some impedance tests, the Li+ diffusion coefficient in $Na_{0.7}K_{0.3}V_3O_8$ was determined from the Warburg straight line and compared with those of $Na_{1+x}V_3O_8$ and $Li_{1+x}V_3O_8$. For the three compounds, one has: $6*10^{-8}$, $2*10^{-8}$ and $1*10^{-8}$ cm$^2$/sec, respectively. The positive effect of a larger interlayer distance, reducing the Li+-layers interactions, is confirmed.

To see how this is reflected on the rate capability, $Na_{1+x}V_3O_8$ and $Na_{0.7}K_{0.3}V_3O_8$ were submitted to discharges at various c.d. (FIG. 3). It can be noted that the two compounds have the same capacity at 1 mA/cm$^2$ (measured after a few preliminary cycles). Thereafter, $Na_{0.7}K_{0.3}V_3O_8$ shows a better capacity retention. Even at 10 mA/cm$^2$ (0.2 h rate), a capacity of 0.10 Ah/g could still be recovered.

Figure 16:
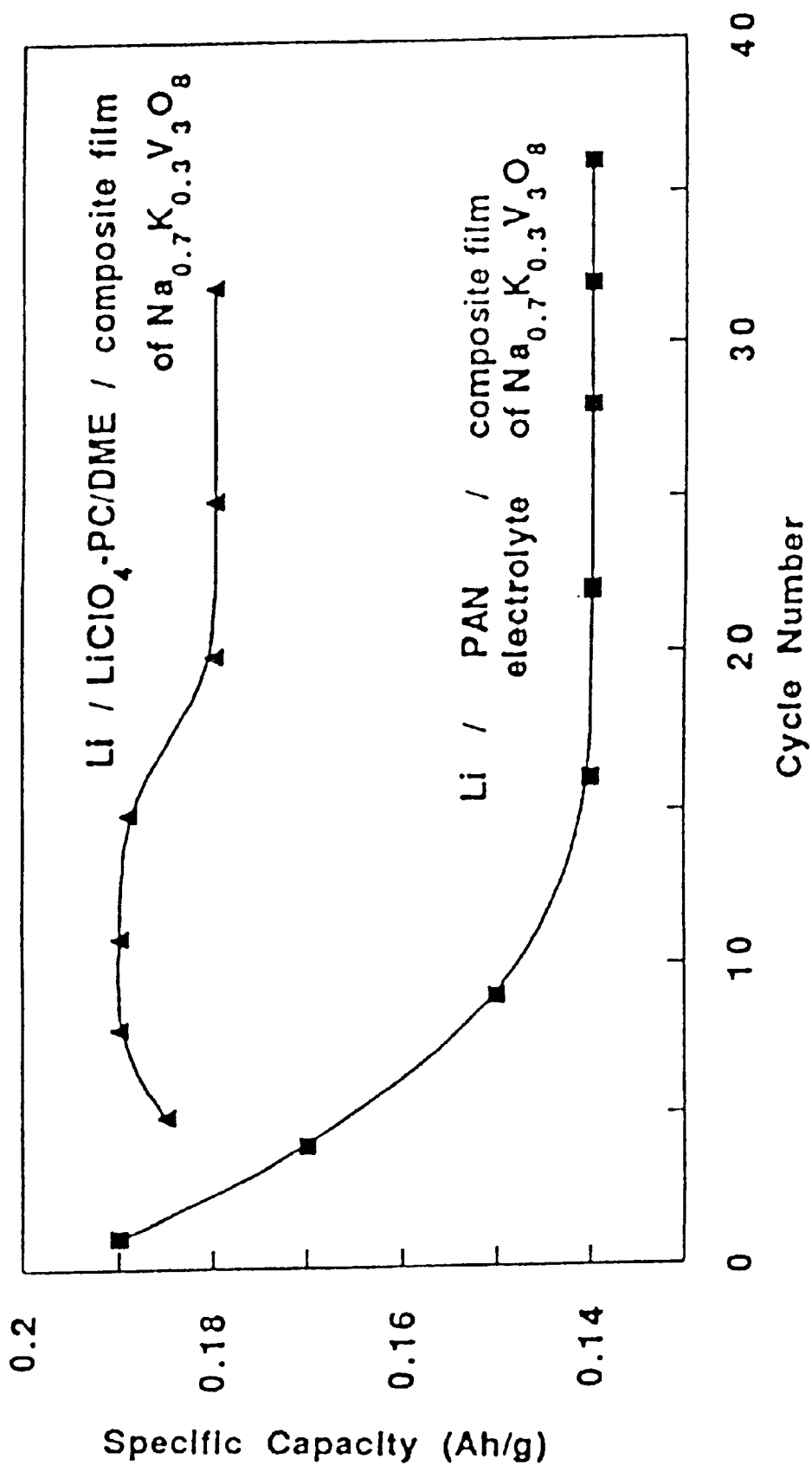
FIG. 16 shows cycling of composite films based on $Na_{0.7}K_{0.3}V_3O_8$ in a liquid electrolyte ($I_d$=1 mA/cm$^2$, $I_c$=0.5 mA/cm$^2$) and in a polymeric electrolyte $I_d$=0.25 mA/cm$^2$, $I_c$=0.125 mA/cm$^2$).

As described above, composite cathodic films were prepared and tested with both liquid and polymeric electrolytes (FIG. 16). This was aimed at ascertaining the suitability of this material in practical cells. With the liquid electrolyte, the performance of the film matched the one obtained with the pelletized cathodic powder. With the polymeric electrolyte, an initial capacity loss, ending after ~10 cycles, was observed. It is obvious that interfacial problems cause this difference. It seemed to be mainly located at the electrolyte/positive electrode interface as the cathodic films work better with liquid electrolytes. In these very preliminary experiments, the cathodic films were prepared by the casting technique. Forming more homogeneous films, as made possible by an electron beam source, will certainly result in an improved performance.

Based on the performance described above, a controlled substitution of K+ for Na+ in $Na_{1+x}V_3O_8$ is advantageous since the configuration of the unit cell is thought not changed. In this way, one obtains an increase of the interlayer distance to some intermediate values between that of $Na_{1+x}V_3O_8$ and the appealing value of $K_{1+x}V_3O_8$ (7.57 Å).

A controlled substitution of K+ for Na+ in $Na_{1+x}V_3O_8$ provides a cathode material endowed with high reversibility and rate capability. Beyond a K+/Na+ ratio of ~0.4, the original unit cell cannot further withstand the strain induced by the bulkier K+ ion and a fraction of the latter gives rise to the formation $K_{1+x}V_3O_8$. As a consequence, the cathode performance becomes poorer.

$K_{1+x}V_3O_8$, although still having a monoclinic unit cell, is not isostructural with the analogous Li or Na vanadates. Indeed, its unit cell parameters are: a=7.629 Å, b=8.349 Å, and c=4.968 Å($\beta$=96°90'), while for $Na_{1+x}V_3O_8$ one has: a=7.38 Å, b=3.62 Å, and c=12.12 Å($\beta$=106°36'). So, in spite of a 33% increase of the K+ radius vs. that of Na+ (1.3 vs. 1.0 Å), the volume only passes from 311 Å to 314 Å. Obviously, $K_{1+x}V_3O_8$ still possesses an open structure which should prove able to intercalate alkali ions.

A material of nominal composition $Na_{0.7}K_{0.3}V_3O_8$ is shown to have high structural stability upon intercalation of large amounts of Li+ (up to ~4 Li+/mol) and high Li+ diffusion coefficient. As a consequence, it can stand overdischarges and cycling at high rates. The limited long-range order brought about by the low temperature synthesis technique and by the structural strain caused by K+ favors the reversibility. The latter also takes advantage of the morphology of this vanadate which is formed by very small particles of high surface area.

As $Na_{1+x}V_3O_8$ had been favorably compared with other well established cathode materials, e.g. $TiS_2$ and $V_6O_{31}$ it can be expected that these mixed Na/K vanadates can also offer a satisfactory performance in practical cells.

It is thought that in Na or K vanadates, alkali ion is present in slight excess; thus, the general formula is represented by $A_{1+x}V_3O_8$. Accordingly, when the mixed vanadates are formed, having the nominal general formula $Na_yK_xV_3O_8$ the sum of x plus y is taken to be greater than 1 and less than 2, or between 1 and 2. Further, if the sum of x plus y exceeds 1 and if $V^{+4}$ is present together with $V^{+5}$, the nominal general formula may also be written as $Na_yK_xV_3O_{8\pm z}$ where, normally, −0.1<z<+0.1 and the oxygen varies between about 7.9 and about 8.1. Still another formula may be adopted to represent the mixed vanadates of the invention, which as stated earlier, is $$(Na_{1-x}K_x)_{1+y}V^{+4}{}_t{}^{3O}V^{+5}{}_{3-t}O_{8+y/2-t/2}$$

A factor which contributes to performance of the active material is the average particle size, which is the average diameter of the Na—K vanadates. Typically, such particle size is less than 5 microns, desirably less than 3 micron, and preferably only 1 micron or less. Advantageously, this particle size is achievable without grinding the vacuum dried dispersed powder.

The invention provides a vanadium oxide compound of the nominal general formula $Na_yK_xV_3O_8$ having high purity, and good energy, power and cycling capability. The process of the invention is efficient and adaptable to production of large quantities of active material in a manufacturing setting with good conversion yields of product from the starting materials.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims:

What is claimed is:

1. A positive electrode comprising a compound represented by the nominal general formula $(Na_{1-x}K_x)_{1+y}V^{+4}{}_t V^{+5}{}_{3-t}O_{8+y/2-t/2}$, where x is greater than 0 and less than or equal to 0.4, y is greater than or equal to 0 and less than or equal to 1, and t is greater than or equal to 0 and less than or equal to 3.

2. The positive electrode according to claim 1 where x is greater than or equal to 0.3 and less than or equal to 0.4.

3. A positive electrode comprising a compound represented by the nominal general formula $Na_{0.7}K_{0.3}V_3O_8$.

4. The positive electrode according to claim 3 having said compound in the form of individual particles having an average size (maximum dimension) less than 10 microns.

5. The positive electrode according to claim 3 having said compound with reduced crystallinity as compared to a $V_3O_8$ compound containing one other constituent selected from sodium and potassium.

6. A positive electrode comprising a compound represented by the nominal general formula $Na_{0.6}K_{0.4}V_3O_8$.

* * * * *